(12) United States Patent
Davis

(10) Patent No.: US 9,914,498 B2
(45) Date of Patent: Mar. 13, 2018

(54) VEHICLE PNEUMATIC CYLINDER AND PENDULUM/VALVE CONTROLLED G-FORCE COMPENSATOR

(71) Applicant: Don Davis, Lebanon, OH (US)

(72) Inventor: Don Davis, Lebanon, OH (US)

(*) Notice: Subject to any disclaimer, the term of this patent is extended or adjusted under 35 U.S.C. 154(b) by 58 days.

(21) Appl. No.: 15/139,591

(22) Filed: Apr. 27, 2016

(65) Prior Publication Data

US 2016/0311492 A1    Oct. 27, 2016

Related U.S. Application Data

(60) Provisional application No. 62/152,983, filed on Apr. 27, 2015.

(51) Int. Cl.

| | | |
|---|---|---|
| *B62K 5/10* | (2013.01) | |
| *B60G 21/00* | (2006.01) | |
| *B62K 5/027* | (2013.01) | |
| *B60G 3/20* | (2006.01) | |
| *B60G 21/073* | (2006.01) | |
| *B62K 5/05* | (2013.01) | |
| *B62K 5/00* | (2013.01) | |
| *B62K 25/04* | (2006.01) | |
| *B62J 17/08* | (2006.01) | |

(52) U.S. Cl.
CPC ............... *B62K 5/10* (2013.01); *B60G 3/20* (2013.01); *B60G 21/007* (2013.01); *B60G 21/073* (2013.01); *B62K 5/027* (2013.01); *B62K 5/05* (2013.01); *B60G 2200/144* (2013.01); *B60G 2200/46* (2013.01); *B60G 2300/122* (2013.01); *B60G 2300/45* (2013.01); *B62J 2017/086* (2013.01); *B62K 2005/001* (2013.01); *B62K 2025/045* (2013.01)

(58) Field of Classification Search
CPC . B62K 5/10; B62K 5/027; B62K 5/05; B60G 3/20; B60G 21/007; B60G 21/073
See application file for complete search history.

(56) References Cited

U.S. PATENT DOCUMENTS

| | | |
|---|---|---|
| 3,836,166 A | 9/1974 | Bainbridge et al. |
| 4,796,720 A | 1/1989 | Bauer |
| 5,609,352 A | 3/1997 | Di Maria |
| 7,131,650 B2 | 11/2006 | Melcher |
| 2008/0012262 A1* | 1/2008 | Carabelli ............... B60G 7/006 280/124.106 |
| 2009/0127017 A1* | 5/2009 | Hartmann ............. B60G 21/06 180/282 |
| 2017/0050693 A1* | 2/2017 | Matties ..................... B62K 5/10 |

\* cited by examiner

*Primary Examiner* — Faye M Fleming
(74) *Attorney, Agent, or Firm* — Taft Stettinius & Hollister LLP; Derek B. Lavender

(57) ABSTRACT

A suspension system with a frame pivotally coupled to a control arm, an actuator pivotally coupled between the frame and the control arm, a control valve fluidly coupled to the actuator, a valve core positioned within the control valve and being slidable between a first position and a second position, and a pendulum coupled to the valve core having a neutral position and an offset position. Further, when the pendulum is in the neutral position, the valve core is in the first position and when the pendulum is in the offset position the valve core is in the second position.

20 Claims, 8 Drawing Sheets

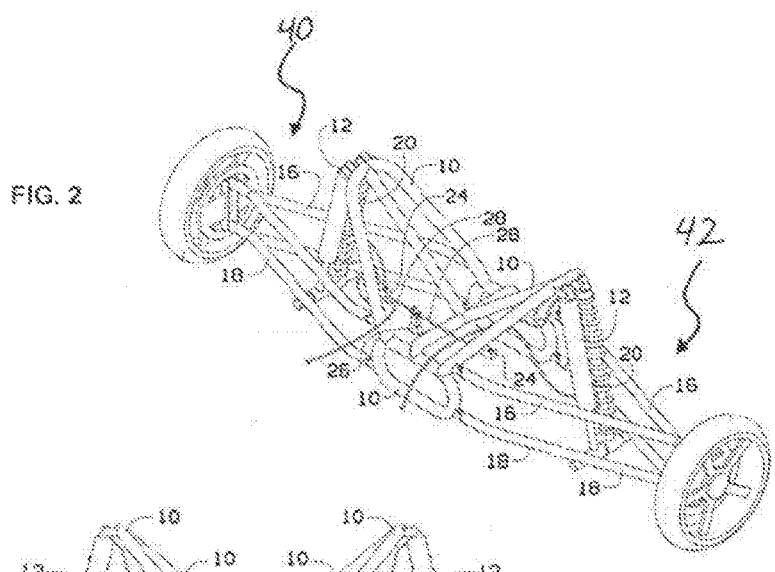
FIG. 2
FIG. 3
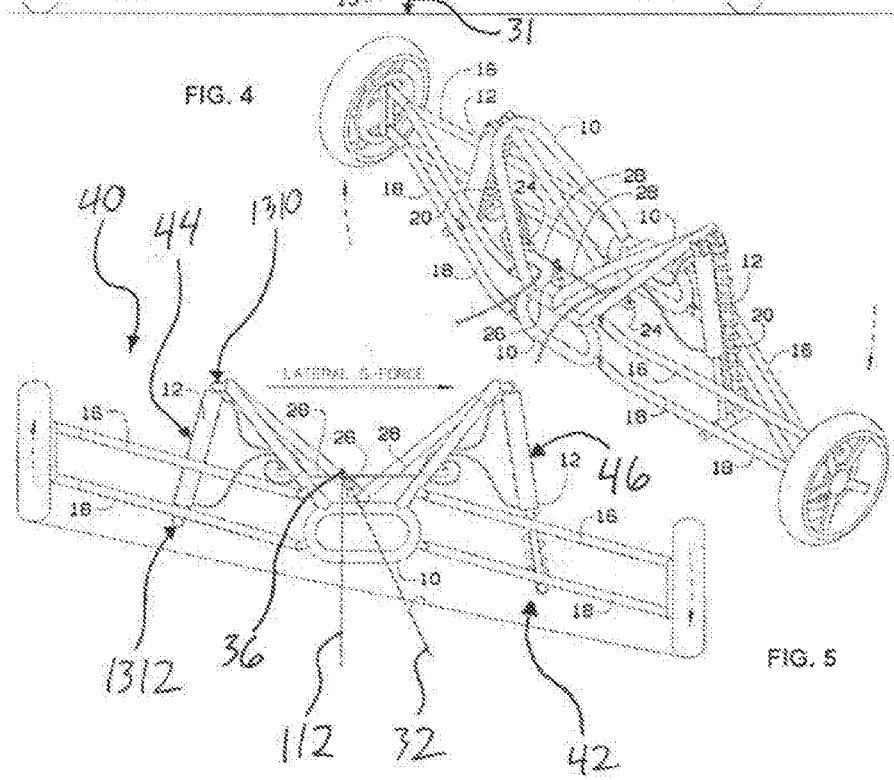
FIG. 4
FIG. 5

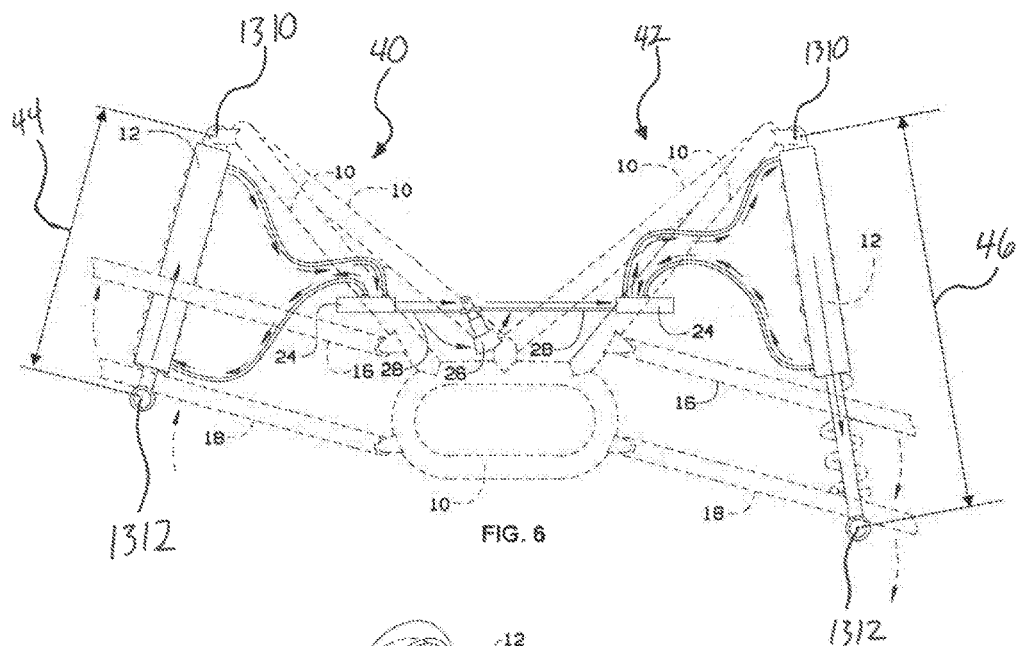
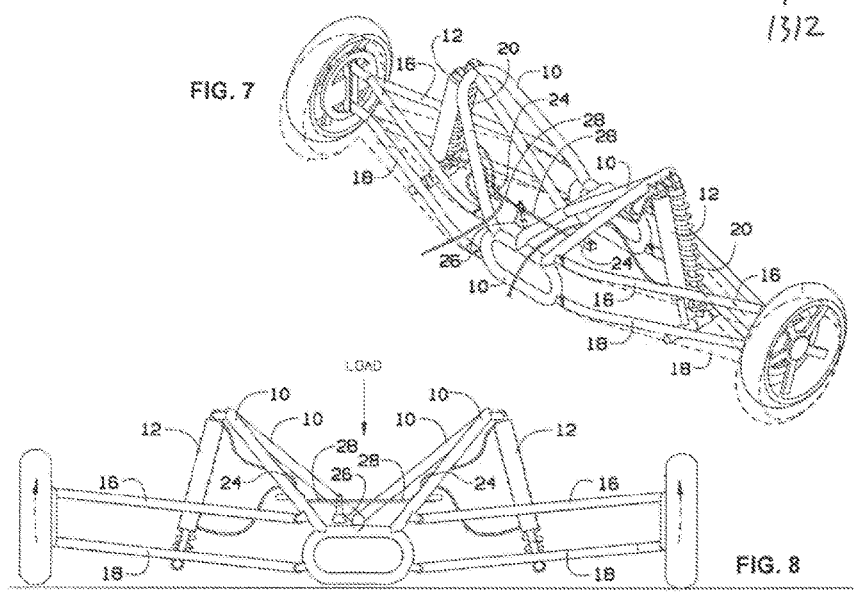

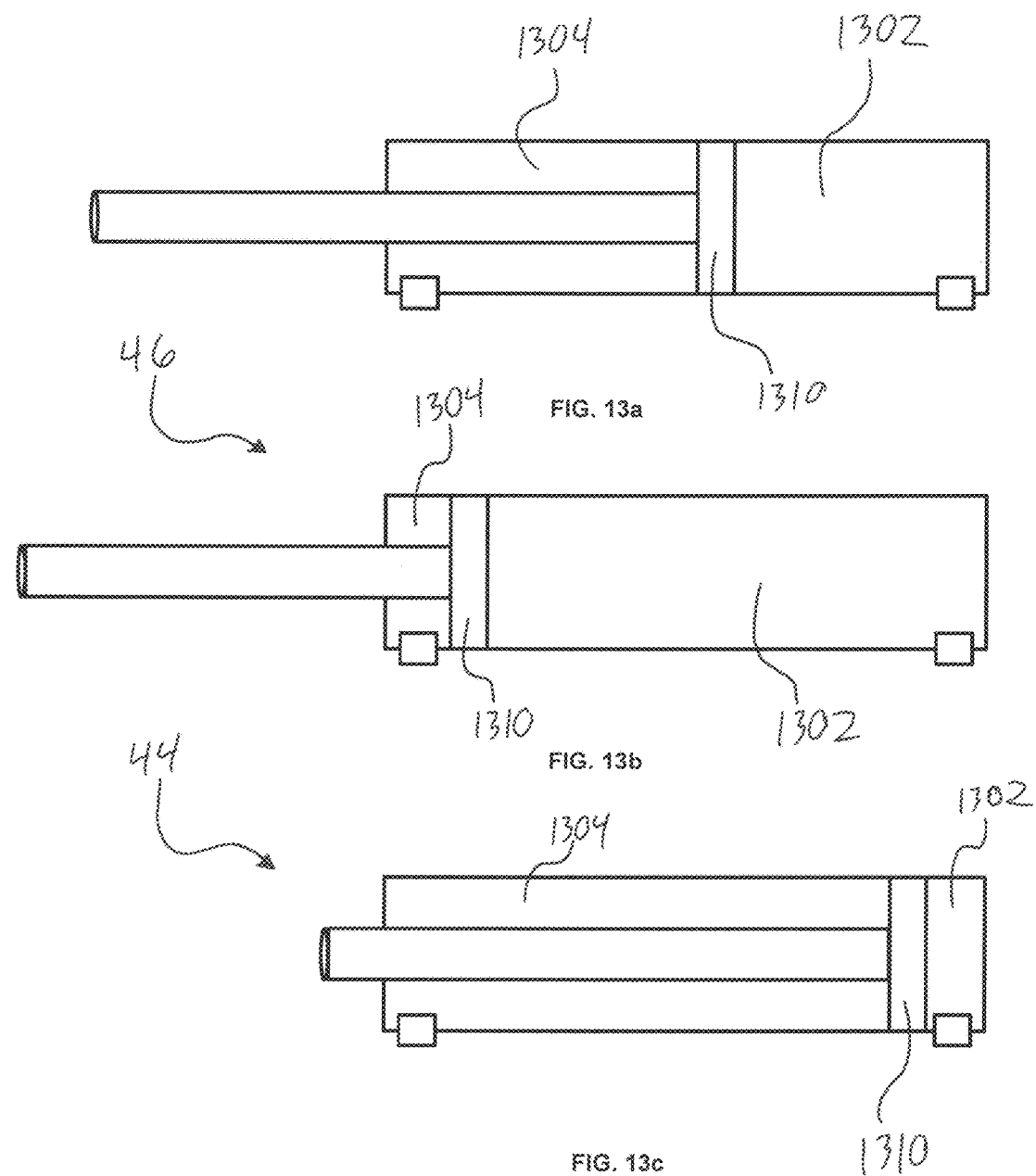

VEHICLE PNEUMATIC CYLINDER AND PENDULUM/VALVE CONTROLLED G-FORCE COMPENSATOR

RELATED APPLICATIONS

The present application claims the priority of U.S. Provisional Application No. 62/152,983, filed Apr. 27, 2015, the disclosure of which is hereby incorporated by reference in its entirety.

TECHNICAL FIELD

The present teachings are related to a motor vehicle capable of turning about a radius, and more particularly a motor vehicle capable of altering a suspension assembly as it is turning about a radius.

BACKGROUND OF THE DISCLOSURE

The statements in this section merely provide background information related to the present disclosure and should not be construed as constituting prior art.

Motor vehicles capable of turning about a radius are very common in the prior art. Motor vehicles can range from motorcycles containing two wheels to tractor/trailer configurations containing more than eighteen wheels. One advantage to a two-wheeled vehicle is the ability of the vehicle to perform a turn maneuver without exposing the driver to gravitational ("G") forces that may pull the driver away from the controls of the vehicle. More specifically, many two-wheeled vehicles have the ability to lean as the vehicle is turning. The leaning motion allows the vehicle to become oriented in substantially the same angle as the force experienced by the operator.

Vehicles with more than two wheels do not substantially lean during a turn operation. More specifically, traditional suspensions often provide a substantially consistent orientation of the vehicle body relative to the road surface unless the suspension experiences an unexpected input. That is to say, the vehicle tends to remains oriented substantially level with the road at all times. Further, in traditional vehicles with more than two wheels, the suspension is typically designed to cushion force inputs. With this type of suspension, when a vehicle performs a turning function, the body of the vehicle has a natural tendency to roll away from the turn. In extreme situations, the operator of the vehicle may become disassociated from the controls of the vehicle and lose control during a turning operation.

The present application is intended to improve upon and resolve some of these known deficiencies of the art. More particularly, this disclosure has been developed to allow a vehicle with more than two wheels to perform a turning operation while the vehicle body is angled in a way that correlates with the forces experienced by the driver. Further, this disclosure allows a vehicle to perform a turning operation without causing the operator to experience forces pulling the operator away from the controls.

SUMMARY

One embodiment is a suspension system comprising a frame pivotally coupled to a control arm, an actuator pivotally coupled between the frame and the control arm, a control valve fluidly coupled to the actuator, a valve core positioned within the control valve and being slidable between a first position and a second position, and a pendulum coupled to the valve core having a neutral position and an offset position, wherein, when the pendulum is in the neutral position, the valve core is in the first position and when the pendulum is in the offset position the valve core is in the second position.

Another embodiment is a pneumatic suspension system of a vehicle comprising a frame defining a body of the vehicle, a first control arm pivotally coupled to the frame at a first end, a first wheel hub pivotally coupled to the first control arm at a second end opposite the first end, a first proportional control valve having a first valve core and being fluidly coupled to an air pressure source, a first actuator fluidly coupled to the first proportional control valve and defining a first base end pivotally coupled to the frame and a first rod end pivotally coupled to the first control arm, a pendulum pivotally coupled to the frame at a pendulum pivot, and a first valve connector rod extending from the pendulum to the first valve core. Wherein, the pendulum moves the valve core when the pendulum moves about the pendulum pivot and the first actuator is repositioned between a maximum length position and a minimum length position as the first valve core moves responsively to the movement of the pendulum.

Another embodiment is a method for adjusting a suspension assembly of a vehicle, comprising providing a frame defining a vehicle axis and having a front and rear portion, a rear wheel coupled to the rear portion of the frame along the vehicle axis, a first and second front wheel coupled to the frame through a respective first and second control arm, a first actuator positioned between the first control arm and the frame and a second actuator positioned between the second control arm and the frame, a pressure source selectively fluidly coupled to the first and second actuator through a respective first and second control valve having a respective first and second valve core, and a pendulum coupled to the first and second valve core, and altering the angular orientation of the first and second control arm relative to the frame by selectively providing a pressurized fluid to the first and second actuator through the respective first and second control valve. Wherein the altering the angular orientation step is performed by moving the respective first and second valve core to selectively provide the pressurized fluid to portions of the respective first and second actuator.

DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein:

FIG. 2 is a perspective view of a portion of one embodiment of the three-wheeled vehicle shown in static state;
FIG. 3 is a front view of the embodiment shown in FIG. 2;
FIG. 4 is a perspective view of the embodiment of FIG. 2 shown in a lateral force applied state;
FIG. 5 is a front view of the embodiment shown in FIG. 4;
FIG. 6 is a detail hidden-line front view of the embodiment of FIG. 5 demonstrating movement and flow directions of multiple components;
FIG. 7 is a perspective view of the embodiment of FIG. 2 shown in load applied state;
FIG. 8 is a front view of the embodiment of FIG. 7;

FIG. 10b is a section view of the valve assembly from FIG. 10a;

FIG. 11b is a front view of the valve assembly of FIG. 11a;

FIG. 11c is a side view of the valve assembly of FIG. 11a;

FIGS. 13a-13c are illustrative diagrams of several positions for an actuator.

Corresponding reference numerals are used to indicate corresponding parts throughout the several views.

DETAILED DESCRIPTION

The above-mentioned aspects of the present application and the manner of obtaining them will become more apparent and the teachings of the present application itself will be better understood by reference to the following description of the embodiments of the present application taken in conjunction with the accompanying drawings.

The embodiments of the present application described below are not intended to be exhaustive or to limit the teachings of the present application to the precise forms disclosed in the following detailed description. Rather, the embodiments are chosen and described so that others skilled in the art may appreciate and understand the principles and practices of the present application.

Unless defined otherwise, all technical and scientific terms used herein have the same meaning as commonly understood by one of ordinary skill in the art to which this application belongs. Although any method and materials similar or equivalent to those described herein can be used in the practice or testing of the present application, the specific methods and materials are now described.

Figure 1:
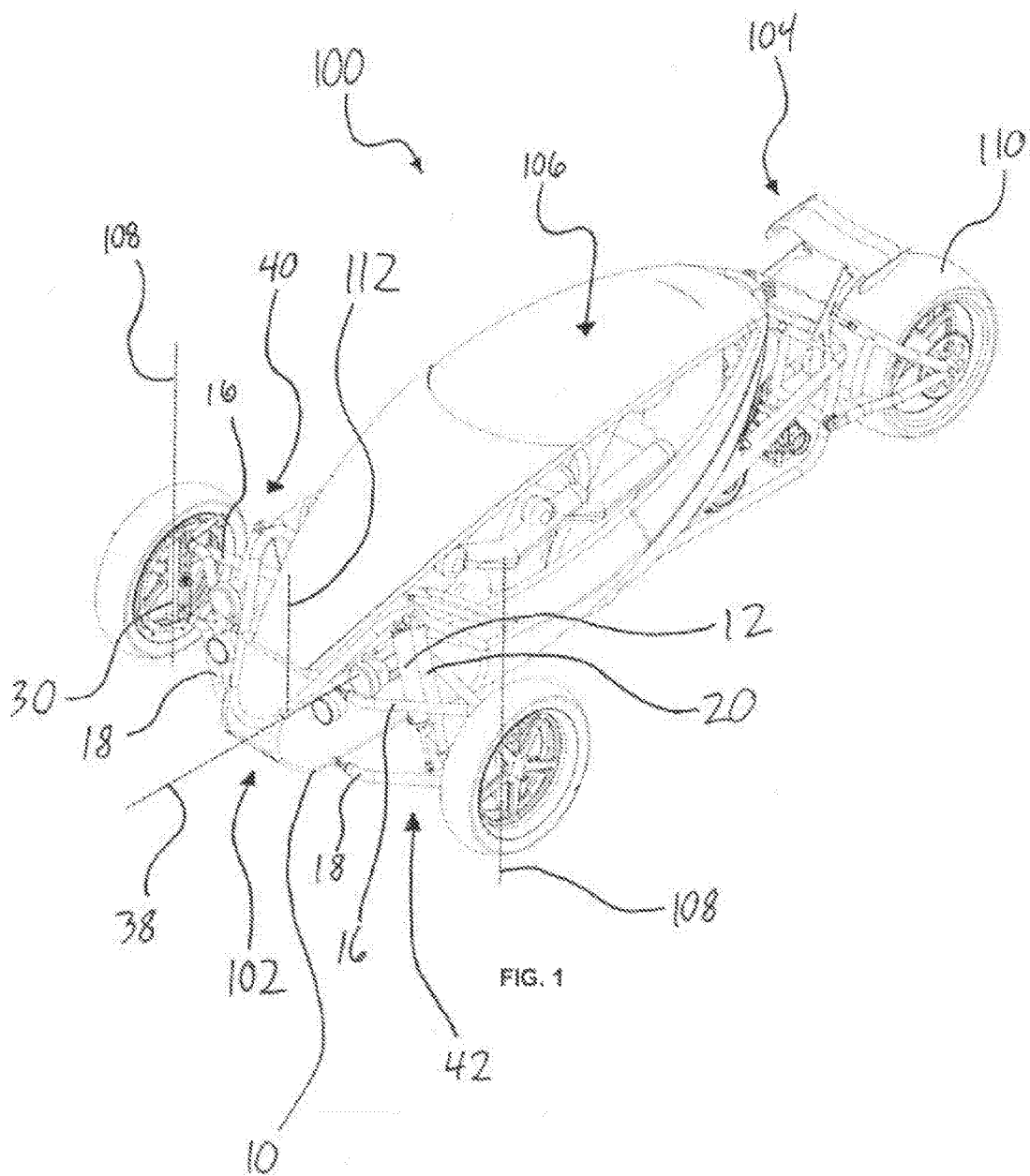
FIG. 1 is a perspective view of a three-wheeled vehicle.

Referring to FIG. 1, a three-wheeled vehicle 100 is shown. The three-wheeled vehicle 100 may have a frame 10 that defines a vehicle axis 38. The three-wheeled vehicle 100 may also have a front portion 102 and a rear portion 104. Between the front and rear portion 102, 104 may be an operator's cabin 106 coupled to the frame 10. The operator's cabin 106 may be a location that allows a user to enter, exit, and control the three-wheeled vehicle 100. Along the rear portion 104 of the vehicle may be a rear wheel 110 pivotally coupled to the frame through a swing-arm and defined at least partially along the vehicle axis 38.

Pivotally coupled to the frame 10 at the front portion of the vehicle 102 may be a first suspension assembly 40 and a second suspension assembly 42. The first suspension assembly 40 may be coupled to the frame 10 on a right side of the vehicle axis 38 relative to the user properly positioned in the operator's cabin 106. Alternatively, the second suspension assembly 42 may be positioned on the left side of the vehicle axis 38 relative to the user properly positioned in the operator's cabin 106.

In the embodiment shown in FIG. 1, each of the first and second suspension assemblies 40, 42 have an upper control arm 16 and a lower control arm 18 coupling a wheel hub 30 to the frame 10. The control arms 16, 18 may be pivotally coupled to the frame 10 on one end and pivotally coupled to the wheel hub 30 on the other end. Further, the wheel hubs 30 may define a wheel hub axis 108 therethrough. Further, the frame 10 may defined a perpendicular axis 112 that may be perpendicular to the frame 10 and extend in the vertical direction when the frame is positioned on a level surface. In one embodiment, the control arms 16, 18 of the respective suspension assemblies 40, 42 allow the wheel hubs 30 to move relative to the frame 10 without substantially changing the alignment of the wheel hub axis 108 relative to the perpendicular axis 112.

Referring now to FIG. 2, this disclosure also includes a pneumatic system of cylinders or actuators 12 mounted to the respective suspension assemblies 40, 42. Further, valve hubs or control valves 24 may be connected to a pendulum 26 that changes the angle of the respective suspension assemblies 40, 42 relative to the frame 10 to counteract lateral gravitational forces ("G force") experienced by the three-wheeled vehicle 100 while cornering. This pneumatic leaning system may use some commonly used suspension components and add the actuators 12 and the control valves 24 to control vehicle lean. Pneumatics are inherently "soft", they give or deflect when a different force is applied. This lends itself to a suspension system that is always seeing different forces and loads. The system is also "active" in that it does not require a center of gravity change of the vehicle or the occupant shifting positions to initiate leaning.

This pneumatic system may be an additional part of the suspension. In one non-limiting example, the pneumatic system may be an active system that changes as the G force experienced by the user changes or as different load conditions are applied to the vehicle. In one embodiment, an enclosed cockpit, or the operator's cabin 106, may encompass a user. Further, the enclosed cockpit may allow the vehicle be driven in inclement weather without exposing the user to the elements. In another embodiment, the pneumatic system may compress or decompress automatically with changing load conditions, allowing for a suspension system without requiring additional electronic or mechanical dampening devices.

A plurality of devices can provide the necessary articulation, whether that be a pneumatic cylinder, airbag, hydraulic actuator, electrical actuator, rotary device, or any other mechanism capable of varying the distance between two objects. An appropriate control mechanism may be required to drive the chosen actuator. In one embodiment, one or more control valves 24, which may be proportional control valves, can be used to control one or more pneumatic cylinder or actuator 12. A plurality of control methods are considered to control the actuation of the suspension. In one embodiment, an electro-mechanical system may be used. In yet another embodiment, the system may be the pendulum 26 that mechanically actuates the valves 24. A pressurized air source may be used to alter the actuators 12. The source of the pressurized air may be a compressor driven off the engine, a dedicated electric pump, an air reservoir or any other similar pressurization system. Accordingly this disclosure is not limited to any particular type of pressurization system and any mechanism that can produce or contain and distribute a pressurized fluid is considered herein.

In one aspect of the present disclosure, the pneumatic actuators 12 may be attached to the vehicle's respective suspension assemblies 40, 42. As described above, the suspension assemblies 40, 42 may have the upper control arm 16 and the lower control arm 18 pivotally coupled to the frame 10 on one end and coupled to the wheel hub assembly 30 on the other end. In the embodiment shown in FIG. 2, a coil-over system 20 may be pivotally coupled to the lower control arm 18 on one end and to the frame 10 on the other. The coil-over suspension 20 may have a spring positioned around a shock-absorbing damper as is known in the art. While a coil-over system 20 has been specifically described, this disclosure is not limited to such a configuration. Rather, in other embodiments a spring may be mounted separate from the shock-absorbing damper. In another embodiment, air-bags may be used instead of a spring. Accordingly, this disclosure is not limited to the specific coil-over system 20 shown and described herein but rather considers other shock-absorber/damper and spring configurations known in the art.

The actuators 12 may also be pivotally coupled between the respective lower control arm 18 and the frame 10. Further, the actuators 12 may selectively push and pull the respective lower control arm 18 to overcome the forces exerted on the lower control arm 18 by the coil-over system 20 to alter the vehicle body orientation. More specifically, in one embodiment the proportional control valves 24 can direct the pressurized air to the respective actuators 12 according to inputs from the pendulum 26. The pendulum 26 may react to lateral G forces applied to the vehicle from cornering, and in turn apply a correlated input to the control valves 24. The compressed air source may drive the respective actuators 12 in the pneumatic system to cause the body of the vehicle to lean into the turn.

Alternatively, any form of capacitor may be used to distribute the reactive forces to the suspension to counter the G forces experienced by the driver. In one embodiment, an electric actuator may be provided electrical signals to change the orientation of the respective suspension assembly 40, 42. In this embodiment, the pendulum 26 may communicate to a controller the desired length of the electric actuator. The controller may then send a signal to the respective actuators 12 to change to the desired length.

Similarly, while a pneumatic system is described throughout, this disclosure considers implementing a hydraulic system as well. In the hydraulic system, the actuators may be hydraulic actuators and the valves may be hydraulic valves. Instead of utilizing a compressor, the vehicle 100 may have a hydraulic pump that provides hydraulic fluid and pressure to the respective hydraulic actuators as directed through the valves. Accordingly, this disclosure may be applied to systems that are not pneumatic in similar ways as described herein for a pneumatic system.

Figure 10A:
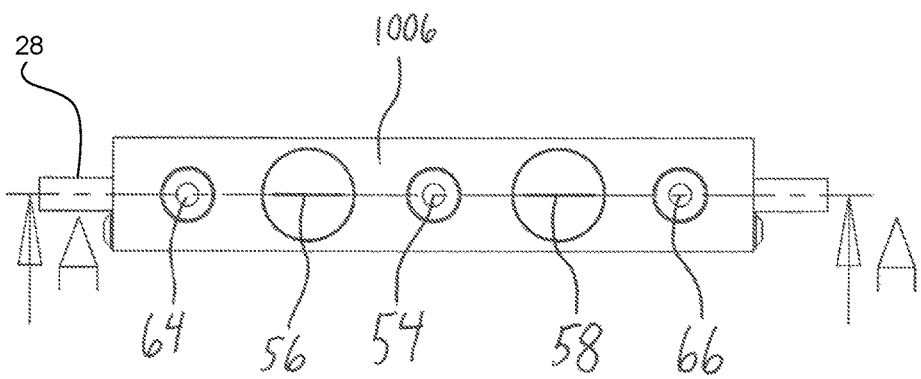
FIG. 10a is a top view of the valve assembly from FIG. 9.
Figure 10B:
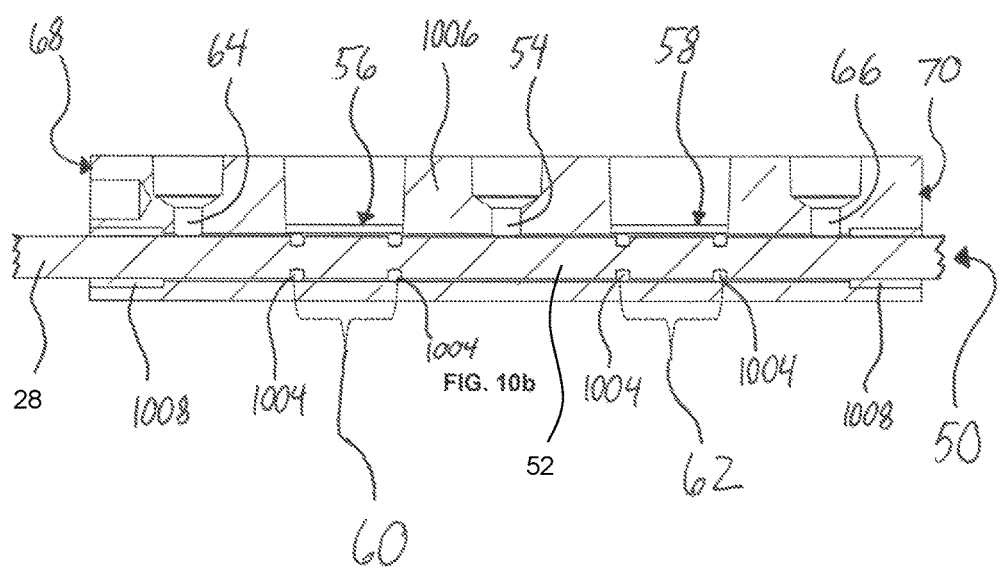
Figure 12A:
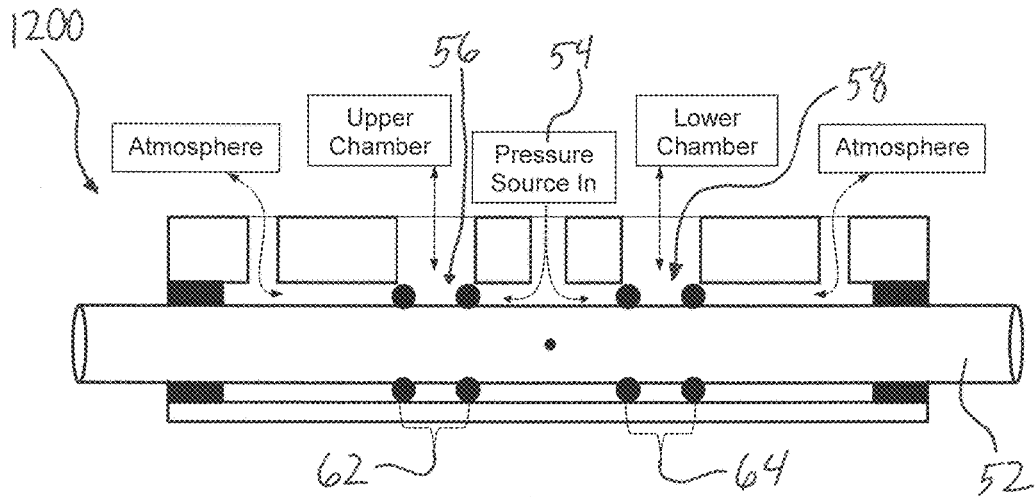
FIGS. 12a-12c are illustrative diagrams of several positions for a valve core.

When the vehicle 100 has no lateral G forces and is at a normal ride height 31, the pendulum 26 and the control valves 24 may be in a neutral position as shown in FIG. 3 (see also FIGS. 10*b* and 12*a*). Further, in the neutral position, little or no air may be flowing to the actuators 12. In another embodiment, when the valves 24 are in the neutral position, air may be flowing to the actuators 12 to maintain the neutral position. When lateral force causes the pendulum 26 to swing away from neutral, a valve core 52 (see FIGS. 10*b*, and 12*a-c*) may be offset (valve core offset in FIGS. 12*b* and 12*c*), directing air to and from either an upper chamber 1302 or a lower chamber 1304 (see FIG. 13*a*) of the actuators 12. Once the pendulum 26 is again in the neutral position, the airflow may stop or otherwise position the actuators 12 in the neutral position until another force is applied to the pendulum 26 or the frame 10. If the system actuators 12 are unable to overcome a force input, or if the lateral force is continually applied beyond what the pneumatic system can compensate for, the pneumatic system may pressurize the respective actuators 12 to their respective maximum point or maximum length position 46 (see FIGS. 5 and 13*b*) and minimum point or minimum length position 44 (see FIGS. 5 and 13*c*) until another input is received from the control valves 24 via the pendulum 26 or force input to the frame 10.

As described above, the actuators 12 may be mounted on a rod end 1312 to the lower control arm 18 or other point on the suspension that is not buffered by suspension, and on a base end 1310 to the frame 10. In one embodiment, this disclosure may utilize the same attachment points as used for a typical strut as is known in the art. Further, the pendulum 26 may be mounted anywhere on the frame 10. In one non-limiting example, the pendulum 26 may be close to the vehicle axis 38, and the control valves 24 may be mounted and attached to the pendulum 26. Air lines may couple the air supply to the valves 24 and actuators 12 as discussed herein.

The control valves 24 may be mounted on each one of the respective suspension assemblies 40, 42 in such a way that the valve cores 52 become offset if a force input causes the frame 10 to move relative to the respective suspension assemblies 40, 42. The movement of the frame 10 may cause the control valves 24 to redirect fluid to provide supplemental pressure to the respective actuators 12 to maintain a consistent ride height. In other words, if a large weight is placed on the vehicle 100, the suspension assemblies 40, 42 deflect as the respective control arms 16, 18 change angular orientation relative to the frame 10. The angular change of the respective control arms 16, 18 relative to the frame 10 may cause the valve cores 52 to become displaced sufficiently to direct pressurized fluid to the upper chamber 1304 of the actuators 12 to push the vehicle back to it's intended ride height. This function may be independent of the leaning feature.

In another embodiment, the valve 24 placement can be adjusted to change ride height, and the actuator pressure can be adjusted to control ride firmness. More specifically, the valves 24 may be mounted on one of the respective control arms 16, 18 with a mounting member that can move the valve 24 linearly relative to the pendulum 26. As the valves 24 are moved closer to the pendulum 26, the valve cores 52 may become offset to direct fluid from an air pressure source to the upper chamber 1302 (see FIG. 12*b*) of the respective actuator 12. Simultaneously, the valve cores 52 may also become offset to direct fluid from the lower chamber 1302 of the respective actuator 12 through an exhaust port 64, 66 and into the surrounding atmosphere. When the upper chamber 1302 fills with the compressed fluid, and the lower chamber 1302 is fluidly coupled to the surrounding atmosphere, the actuator 12 will move the rode end 1312 telescopically away from the base end 1310 thereby lengthening the distance between the base end 1310 and the rod end 1312 of the actuator 12. Further, the respective control arms 16, 18 will pivot relative to the frame 10 to accommodate the increased length of the actuator 12. In this embodiment, when the pendulum 26 remains in a neutral position, the actuators 12 will pivot the respective control arms 16, 18 relative to the frame 10 until the frame 10 is positioned at the adjusted ride height 31. When the frame 10 is at the proper ride height 31, the valve cores 52 may be positioned in the neutral position (see FIG. 12*a*) within the respective valves 24.

In another embodiment, the valves 24 may be coupled to one of the respective upper or lower control arms 16, 18 while the pendulum 26 is mounted to the frame 10 as described above. In this configuration, as the upper and lower control arms 16, 18 move relative to the frame 10, the valve core 52 may also move within the respective valve 24. More specifically, in one non-limiting example the actuators 12 may be in a neutral state when the vehicle is empty, maintaining the predefined ride height 31 of the frame 10 relative to the underlying surface. When a user enters the vehicle, the coil-over system 20 and the actuators 12 may compress as the frame 10 is forced closer to the underlying surface because of the weight of the user. Further, as the frame 10 is forced closer to the underlying surface, the respective control arms 16, 18 may pivot relative to the frame 10. Because the respective valves 24 are coupled to the control arms 16, 18, the movement of the control arms 16, 18 relative to the frame 10 may also move the valve cores 52 of the respective valves 24 to pressurize the upper chamber 1302 of the respective actuators 12 to return the frame 10 to the predefined ride height as described above.

The leaning system may also be automatic. The leaning system may be selectively engageable by the user via a user input, such as a switch, valve, or any other common switching mechanism known in the art. The pendulum 26 may automatically sense and adjust the suspension when the leaning system is engaged as described above. In one embodiment, the system may automatically lean into corners and remain level when stopped without additional user inputs. The user may be able to adjust ride height or ride firmness via an electronic controller, a manual valve, or any other known method for changing a setting in a hydraulic, electro-mechanical, pneumatic, or the like system.

While a three-wheeled vehicle has been shown and described herein, this system may be implemented into a plurality of different vehicle platforms, including, but not limited to, three-wheeled vehicles, four-wheeled vehicles, and any other vehicle having more than two wheels. In one embodiment, this disclosure could be utilized as a safety mechanism for tractor trailers. For example, if a certain safety point is passed and the center of gravity approaches a tip over location, the system may activate and shift the center of gravity away from the tip over location. Further, busses, passenger trains, and any other similar public transportation vehicle might implement the teachings of this disclosure.

Referring now to FIG. 5, the pendulum 26 is shown in an offset position. More specifically, the pendulum 26 may define a pendulum axis 32. When the pendulum 26 is in the offset position as shown in FIG. 5, the pendulum axis 32 may become offset from the perpendicular axis 112. Further, as the pendulum axis 32 transitions from the neutral position of FIG. 2 to the offset position of FIG. 5, the pendulum 26 may pivot about a pendulum pivot 36. The pendulum pivot 36 may be a boss, a shaft, a bolt or any other similar member that will allow the pendulum 26 to become pivotally coupled thereto.

In FIG. 5, the suspension assemblies 40, 42 are shown with the control arms 16, 18 of the first suspension assembly 40 in a minimum angle relative to the frame 10 while the control arms 16, 18 of the second suspension assembly 42 are in a maximum angle relative to the frame 10. Further, the first suspension assembly 40 may be capable of a maximum angle and the second suspension assembly 42 may be capable of a minimum angle depending on the length of the respective actuators 12. More specifically, the angle of the suspension assemblies 40, 42 relative to the frame 10 may cause the frame 10 to become angularly offset from the underlying surface thereby allowing the vehicle 100 to simulate a lean position where the operator's cabin 106 leans into a turn similarly to a two-wheeled vehicle.

In one embodiment, a valve connector rod 28 may be coupled to the pendulum 26 on one end, and to one of the valve cores 52 on the other end. The valve connector rod 28 may be pivotally coupled to the pendulum 26 at a location offset from the pendulum pivot 36. Accordingly, when the pendulum 26 pivots about the pendulum pivot 36, the valve connector rod 28 displaces the respective valve core 52. In turn, the control valve 24 fluidly couples one chamber 1302, 1304 of the actuator 12 to the pressure source while fluidly coupling the other chamber 1302, 1304 of the same actuator 12 to the exhaust port 64, 66 as will be described in more detail below. In this configuration, when the pendulum 26 pivots about the pendulum pivot 36, the actuator 12 may change lengths and thereby alter the angular orientation of the control arms 16, 18 in the respective suspension assemblies 40, 42 relative to the frame 10.

In one non-limiting example shown in FIG. 6, the actuator 12 of the first suspension assembly 40 may be at the minimum point or in a minimum length position 44 while the actuator 12 of the second suspension assembly 42 may be in the maximum point or in a maximum length position 46. The position of the first and second suspension assembly 40, 42 may be controlled by the position of the actuators 12 responsive to the control valves 24. In other words, if the pendulum 26 alters the location of the valve cores 52 in the respective control valves 24, the actuators 12 may manipulate the orientation of the respective first and second suspension assemblies 40, 42 responsive thereto.

Figure 9:
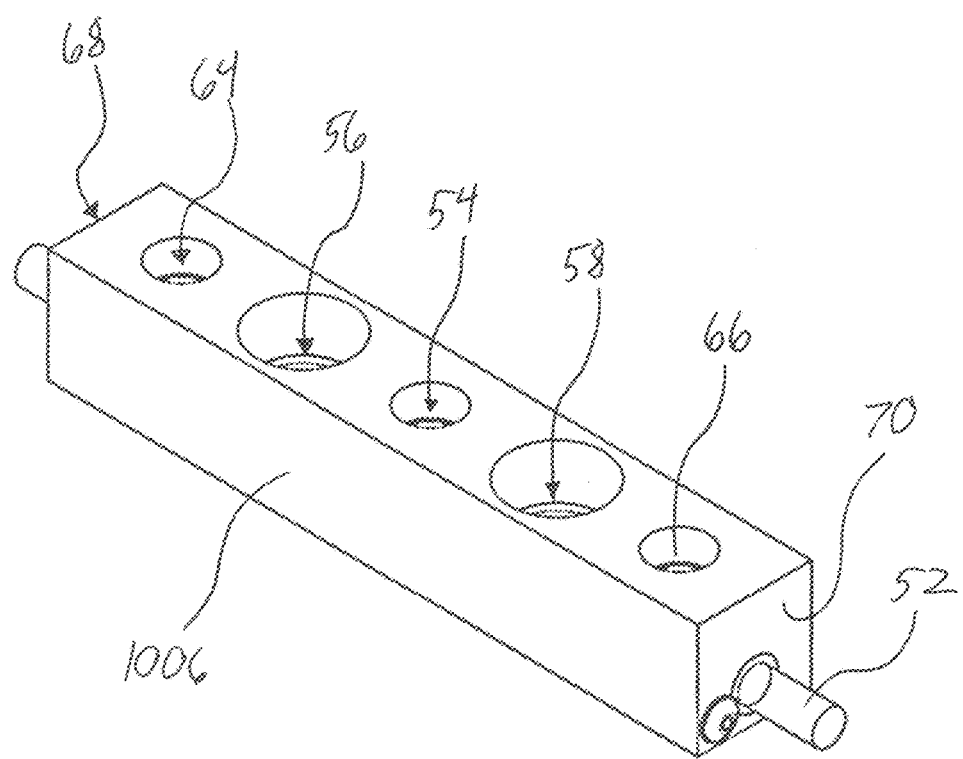
FIG. 9 is an isolated perspective view of a valve assembly.

Now referring to FIGS. 9, 10a and 10b, a valve body 1006 and the valve core 52 are shown. The valve core 52 may substantially control the lean function. The valve core 52 may have four o-ring seals 1004 and slide back and forth within the valve body 1006. As the valve core 52 slides axially within the valve body 1006, the valve core 52 may direct air to pressurize the first or upper chamber 1302 of the actuator 12 and exhaust the second or lower chamber 1304 as described above. The flow rate of air directed towards or away from the upper or lower chamber 1302, 1304 may be proportional to the movement of the valve core 52 in response to the pendulum's 26 movement by a corresponding G force. In one non-exclusive example, the valve core 52 may direct air or other fluid through a plurality of orifices defined in the valve body 1006 as shown and described in more detail with reference to FIGS. 12a-12c. In one non-limiting embodiment, the orifices may be about ten thousandths wide by half inch long slits that run parallel to the axis of the valve core 52 at the base of a threaded hole.

Referring now to FIGS. 10a-10b, one embodiment of the control valve 24 is shown. In the embodiment of FIGS. 10a-10b, the valve body 1006 is shown with a plurality of passageways defined therein. More specifically, the valve body 1006 may define an inner cavity 50 therein (inner cavity 50 shown with valve core 52 therethrough in FIG. 10b). The inner cavity 50 may be a through-hole extending longitudinally through the valve body 1006 and be sized to correspond with the valve core 52. The valve core 52 may have a diameter that is slightly less than the inner cavity 50, allowing air or other fluid to become positioned between the valve body 1006 and the valve core 52. Further, a pressure source inlet 54 may provide a location to couple a hose or other fluid channel to the valve body 1006 to direct air or other fluid into the inner cavity 50. More specifically, the pressure source inlet 54 may be fluidly coupled to the pressure source to provide a compressed air or other fluid to the inner cavity 50 through the pressure source inlet 54.

Similarly, a first slit 56 may be defined in the valve body 1006 to provide another location to provide fluid coupling to the inner cavity 50. The first slit 56 may be fluidly coupled to a hose or other fluid channel that is further coupled to the upper chamber 1302 or first portion of the actuator 12.

Accordingly, air or other fluids may be directed to and from the upper chamber 1302 of the actuator 12 through the first slit 56 and into the inner cavity 50 based on the position of the valve core 52.

On the other side of the pressure source inlet 54 may be a second slit 58. The second slit 58 may be defined in the valve body 1006 to provide another location fluidly coupled to the inner cavity 50. The second slit 58 may be fluidly coupled to a hose or other fluid channel that is further coupled to the lower chamber 1304 or second portion of the actuator 12. Accordingly, air or other fluid may be directed to and from the lower chamber 1304 of the actuator 12 through the second slit 58 and into the inner cavity 50 based on the position of the valve core 52.

In the embodiment of FIG. 10*b*, the O-rings 1004 may act as a first fluid seal 60 positioned about the valve core 52 within the inner cavity 50. The first fluid seal 60 may be positioned axially along the valve core 52 adjacent to the first slit 56 when the valve core 52 is in the neutral position as shown in FIG. 10*b*. Similarly, a second fluid seal 62 is shown positioned about the valve core 52 within the inner cavity 50. The second fluid seal 62 may be positioned axially along the valve core 52 adjacent to the second slit 58 when the valve core 52 is in the neutral position as shown in FIG. 10*b*.

The first and second fluid seals 60, 62 may each be the plurality of O-rings 1004 described above and spaced from one another. In one embodiment, the first fluid seal 60 is a first and second O-ring spaced from one another while the second fluid seal 62 is a third and fourth O-ring spaced from one another. While O-rings have been shown and described herein for the first and second fluid seals 60, 62, this disclosure also considers other means for creating a seal between the valve core 56 and the inner cavity 50. More specifically, in another embodiment, the first and second fluid seals 60, 62 may each be comprised of a single sleeve of material such as rubber, bronze, brass, nylon or the like and be sized to substantially fill the space between the valve core 52 and the inner cavity 50. Accordingly, this disclosure is not limited to any particular type of fluid seal and many different types of fluid seals are considered herein.

A first and second exhaust port 64, 66 may also be defined in the valve body 1006 and provide a fluid path between the surrounding atmosphere and the inner cavity 50. The first exhaust port 64 may be defined in a portion of the valve body 1006 that is proximate to a first wall 68. Alternatively, the second exhaust port 66 may be positioned along the valve body 1006 proximate to a second wall 70. In this embodiment, the first slit 56, pressure source inlet 54, and second slit 58 may be positioned in the valve body 1006 between the first and second exhaust port 64, 66.

Figure 11A:
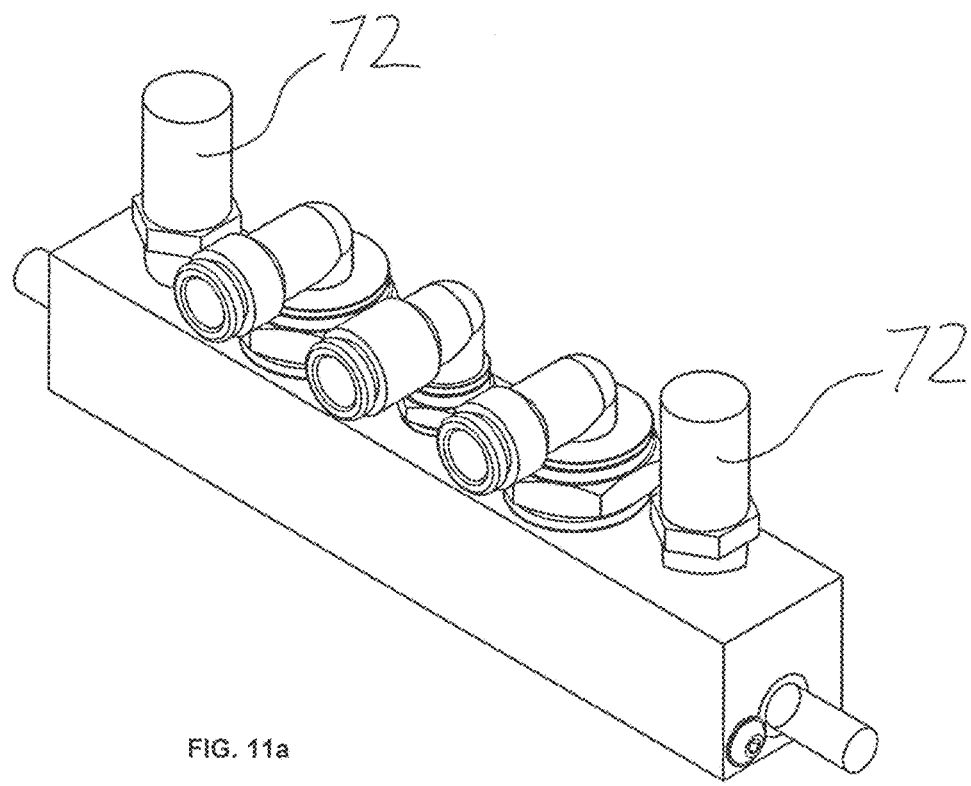
FIG. 11a is a perspective view of a valve assembly with fixtures.
Figure 11B:
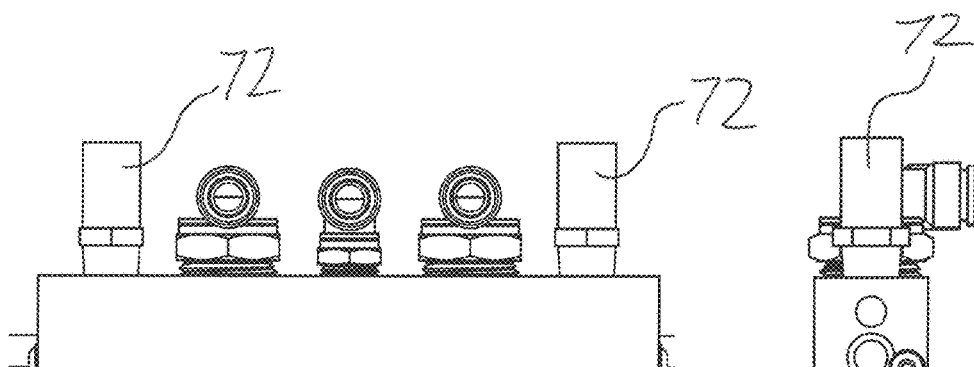
Figure 11C:
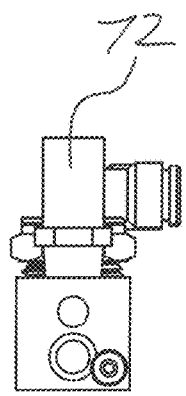

In the embodiment shown in FIGS. 11*a*-11*c*, a first and second exhaust baffle 72, 74 are coupled to the valve body 1006 at the respective first and second exhaust port 64, 66. In this embodiment, the first and second exhaust baffle 72, 74 may provide a baffle for noises generated when air or other fluid is directed out of the inner cavity 50, through the respective first or second exhaust port 64, 66, and into the surrounding atmosphere. The exhaust baffles 72, 74 may be made of any material that can reduce the amount of noise generated as air or other fluid is exhausted from the respective exhaust port 64, 66. In one embodiment, the baffles 72, 74 may be made of foam or any other similar material that would redirect air or other fluids being exhausted from the respective exhaust port 64, 66 to reduce the audible noise generated by the air or other fluid.

In one aspect of the present disclosure, the first and second slit 56, 58 may have a length greater than their respective width and extend lengthwise along inner cavity 50 along a top surface. As the fluid seals 60, 62 are moved along the respective slits 56, 58, the portion of the respective slits 56, 58 covered by the respective fluid seals 60, 62 may be reduced, fluidly coupling the respective slits 56, 58 to either the pressure source inlet 54 or the respective exhaust port 64, 66. More specifically, in the embodiment shown in FIG. 12*c*, if the valve core 52 slides in a first direction 76, the first fluid seal 60 may cover the portion of the first slit 56 positioned proximate to the pressure source inlet 54, thereby fluidly sealing the first slit 56 from the pressure source inlet 54. At the same time, the second fluid seal 62 may slide away from the pressure source inlet 54 as the valve core 52 slides in the first direction 76, thereby fluidly coupling the second slit 58 to the pressure source inlet 54. Further, as the valve core 52 slides farther in the first direction 76, a greater portion of the second slit 58 is exposed to the inner cavity 50, thereby allowing a greater flow rate of fluid from the pressure source inlet 54 through the second slit 58 as the second fluid seal 62 moves in the first direction 76. Similar principle apply as well for the first fluid seal 60 at the first slit 56 albeit regarding fluidly coupling the first slit 56 with the first exhaust port 64.

Figure 12B:
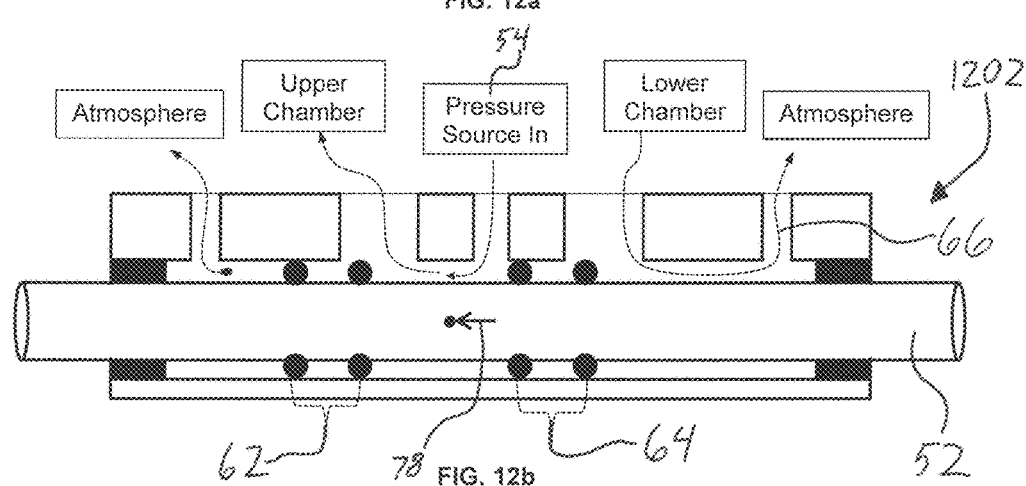
Figure 12C:
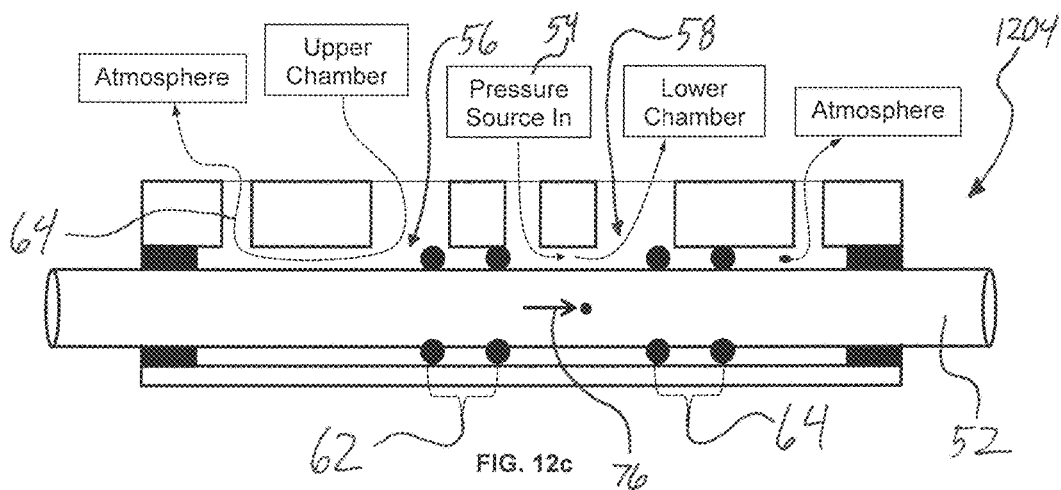

Referring now to FIGS. 12*a*-12*c*, different valve core 52 positions are shown. In FIG. 12*a*, the valve core 52 is in a neutral position. In the neutral position, the air provided through the pressure source inlet 54 may be blocked from entering either the first slit 56 or the second slit 58 by the respective first and second seal 62, 64 or the first and second seal 62, 64 may allow portions of both the first and second slits 56, 58 to be fluidly coupled to both the pressure source inlet 54 and the exhaust ports 64, 66 simultaneously.

In FIG. 12*b*, the valve core 52 is biased towards a second direction 78. In this position, the pressurized air or other fluid provided through the pressure source inlet 54 may be fluidly coupled through the first slit 56 to the upper chamber 1302 of the actuator 12. Further, in the position shown in FIG. 12*b*, the lower chamber 1304 of the actuator 12 may be fluidly coupled to the atmosphere through the exhaust port 66. Accordingly, when the valve core 52 is in the position shown in FIG. 12*b*, the upper chamber 1302 may be provided pressurized fluid while the lower chamber 1304 is fluidly coupled to the atmosphere. The pressure provided to the upper chamber 1302 combined with the fluid routing of the lower chamber 1304 out the exhaust port 66 to a lower pressure atmosphere may be sufficient to force the piston 1310 towards the lower chamber 1304 thereby orienting the actuator in the maximum length position 46.

In FIG. 12*c*, the valve core 52 is biased towards the first direction 76. In this position, the pressurized air or other fluid provided through the pressure source inlet 54 may be fluidly coupled through the second slit 58 to the lower chamber 1304 of the actuator 12. Further, in the position shown in FIG. 12*c*, the upper chamber 1302 of the actuator 12 may be fluidly coupled to the atmosphere through the exhaust port 64. Accordingly, when the valve core 52 is in the position shown in FIG. 12*c*, the lower chamber 1304 may be provided pressurized fluid while the upper chamber 1302 is fluidly coupled to the atmosphere. The pressure provided to the lower chamber 1304 combined with the fluid routing of the upper chamber 1302 out the exhaust port 64 to a lower pressure atmosphere may be sufficient to force the piston 1310 towards the upper chamber 1302 thereby orienting the actuator 12 in the minimum length position 44.

In one embodiment, the valves 24 of the respective first and second suspension assembly 40, 42 may be coupled to the pendulum 26 to become positioned in substantially the opposite position of one another. That is to say, when the valve core 52 of the first suspension assembly 40 is moved the first direction 76 (FIG. 12b) the valve core 52 of the second suspension assembly 42 is moved the second direction 78. In this configuration, when the pendulum 26 pivots, the movement of the respective valve cores 52 may cause the actuator 12 from the first suspension assembly 40 to move towards the minimum length position 44 while the actuator 12 from the second suspension assembly 42 moves towards the maximum length position 46 or vice versa. Accordingly, as the pendulum 26 pivots responsive to a G force, the actuators 12 of the first and second suspension assembly 40, 42 may change the angular orientation of the frame 10 relative to the underlying surface by changing lengths of the actuators 12 as described above.

While the valve core 52 and the valve connector rod 28 have been described as different components, in one embodiment the valve core 52 and the connector rod 28 may be one integral piece. Further, a bushing 1008 may be positioned within the valve body 1006 at each of the first wall 68 and the second wall 70. The bushings 1008 may guide the valve core 52 portion of the valve connector rod 28 substantially axially through the inner cavity 50 to ensure the first and second fluid seals 60, 62 remain properly spaced therein.

In yet another embodiment, the movement of the pendulum 26 may be dampened. More specifically, in one embodiment damping grease may be used at the pendulum pivot 36. The damping grease may slow the rotation of the pendulum 26 to reduce movement to high frequency inputs. In another embodiment, a spring may be positioned by the pendulum 26 to ensure that only G forces caused by a turning function move the pendulum 26. Similarly, in another embodiment a shaft of the pendulum pivot 36 may have a detent formed therein. The pendulum 26 may have a corresponding springed member pressing against the shaft. When the springed member becomes positioned within the detent, the pendulum 26 may require an additional force to overcome the retention of the springed member within the detent. In this embodiment, the pendulum may be maintained in the neutral position unless the additional force is applied to the pendulum 26.

While an exemplary embodiment incorporating the principles of the present application has been disclosed hereinabove, the present application is not limited to the disclosed embodiments. Instead, this application is intended to cover any variations, uses, or adaptations of the application using its general principles. Further, this application is intended to cover such departures from the present disclosure as come within known or customary practice in the art to which this present application pertains and which fall within the limits of the appended claims.

The terminology used herein is for the purpose of describing particular illustrative embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations).

The invention claimed is:

1. A suspension system comprising:
a frame pivotally coupled to a control arm;
an actuator pivotally coupled between the frame and the control arm;
a control valve fluidly coupled to the actuator;
a valve core positioned within the control valve and being slidable between a first position and a second position; and
a pendulum coupled to the valve core having a neutral position and an offset position;
wherein, when the pendulum is in the neutral position, the valve core is in the first position and when the pendulum is in the offset position the valve core is in the second position.

2. The suspension system of claim 1, wherein the actuator has a maximum point and minimum point, wherein when the valve core is in the second position, the actuator is in the maximum point.

3. The suspension system of claim 2, wherein when the valve core is in the first position, the actuator is between the minimum point and the maximum point.

4. The suspension system of claim 1, further comprising a compressor fluidly coupled to the control valve.

5. The suspension system of claim 1, further comprising a valve connector rod extending from the pendulum to the valve core.

6. The suspension system of claim 1, further comprising a shock-absorbing dampener pivotally coupled to the frame on one end and to the control arm on the other end.

7. The suspension system of claim 6, further comprising a spring positioned between the frame and the control arm, wherein the spring has a neutral state and a deformed state and the actuator maintains the spring in a deformed state when the valve core is in the second position.

8. A pneumatic suspension system of a vehicle comprising:
a frame defining a body of the vehicle;
a first control arm pivotally coupled to the frame at a first end;
a first wheel hub pivotally coupled to the first control arm at a second end opposite the first end;
a first proportional control valve having a first valve core and being fluidly coupled to an air pressure source;
a first actuator fluidly coupled to the first proportional control valve and defining a first base end pivotally coupled to the frame and a first rod end pivotally coupled to the first control arm;
a pendulum pivotally coupled to the frame at a pendulum pivot; and
a first valve connector rod extending from the pendulum to the first valve core;
wherein, the pendulum moves the valve core when the pendulum moves about the pendulum pivot;
further wherein, the first actuator is repositioned between a maximum length position and a minimum length position as the first valve core moves responsively to the movement of the pendulum.

9. The pneumatic suspension system of claim 8, wherein the vehicle consist of only three wheels.

10. The pneumatic suspension system of claim 9, further comprising:
a second control arm pivotally coupled to the frame at a first end;
a second wheel hub pivotally coupled to the second control arm at a second end opposite the first end;
a second proportional control valve having a second valve core and being fluidly coupled to the air pressure source;
a second actuator fluidly coupled to the second proportional control valve and defining a second base end pivotally coupled to the frame and a second rod end pivotally coupled to the second control arm;
wherein, the second actuator is repositioned between a maximum length position and a minimum length position as the second valve core moves responsive to the rotation of the pendulum.

11. The pneumatic suspension system of claim 10, wherein when the first actuator moves towards the maximum length position, the second actuator moves towards the minimum length position.

12. The pneumatic suspension system of claim 10, further comprising a first wheel coupled to the first wheel hub, a second wheel coupled to the second wheel hub, and a third wheel coupled to a third wheel hub, wherein the third wheel is positioned along a vehicle axis that is defined longitudinally through the vehicle.

13. The pneumatic suspension system of claim 9, wherein the first proportional control valve further comprises:
a valve housing defining an inner cavity therein;
an inlet port defined in the valve housing and providing a port to fluidly couple the air pressure source to the inner cavity;
a first slit defined in the valve housing and providing a port to fluidly couple the inner cavity to a first portion of the actuator;
a second slit defined in the valve housing and providing a port to fluidly couple the inner cavity to second portion of the actuator;
a first fluid seal positioned between the first valve core and the inner cavity of the valve housing axially proximate to the first slit; and
a second fluid seal positioned between the first valve core and the inner cavity of the valve housing axially proximate to the second slit;
wherein, if the valve core moves in a first direction, only the first slit is fluidly coupled with inlet port;
further wherein, if the valve core moves in a second direction, only the second slit is fluidly coupled with the inlet port.

14. The pneumatic suspension system of claim 13, further comprising:
a first exhaust port defined in the valve housing providing a first fluid path from the inner cavity to a surrounding atmosphere;
a second exhaust port defined in the valve housing providing a second fluid path from the inner cavity to the surrounding atmosphere.

15. The pneumatic suspension system of claim 14, wherein when the valve core moves in the first direction, the second slit is fluidly coupled with the second exhaust port and the first slit is not fluidly coupled to the first exhaust port; and
wherein, if the valve core moves in the second direction, the first slit is fluidly coupled with the first exhaust port and the second slit is not fluidly coupled to the second exhaust port.

16. A method for adjusting a suspension assembly of a vehicle, comprising:
providing a frame defining a vehicle axis and having a front and rear portion, a rear wheel coupled to the rear portion of the frame along the vehicle axis, a first and second front wheel coupled to the frame through a respective first and second control arm, a first actuator positioned between the first control arm and the frame and a second actuator positioned between the second control arm and the frame, a pressure source selectively fluidly coupled to the first and second actuator through a respective first and second control valve having a respective first and second valve core, and a pendulum coupled to the first and second valve core;
altering the angular orientation of the first and second control arm relative to the frame by selectively providing a pressurized fluid to the first and second actuator through the respective first and second control valve;
wherein the altering the angular orientation step is performed by moving the respective first and second valve core to selectively provide the pressurized fluid to portions of the respective first and second actuator.

17. The method of claim 16, wherein each of the first and second actuator comprise a cylinder that defines an upper chamber separated from a lower chamber by a piston, wherein the position of the pendulum selectively provides pressurized fluid to either the upper chamber or the lower chamber of the respective first and second actuator.

18. The method of claim 17, further comprising selectively fluidly coupling the upper chamber or the lower chamber of the respective first or second actuator with an exhaust port defined in the control valve when the opposing upper or lower chamber is provided with pressurized fluid.

19. The method of claim 16, wherein the first and second control valves are coupled to the respective first and second control arms and the altering the angular orientation step is performed when the pendulum does not substantially change positions and a force input changes the angular orientation of one of the first or second control arms relative to the frame.

20. The method of claim 19, further comprising moving the first or second valve core when the respective first or second control arm changes angular orientation relative to the frame and the pendulum does not substantially change positions relative to the frame.

* * * * *